Dec. 19, 1967 N. H. EDSTROM ETAL 3,359,371
CONTROL ARRANGEMENT FOR A RECEIVER FOR PULSE-CODE
MODULATED TIME-DIVISION MULTIPLEX SIGNALS
Filed June 3, 1965

INVENTORS
NILS HERBERT EDSTRÖM
STURE EMIL INGVAR FJORDLAND
WALTER EMIL WILHELM JACOB
JÖNS KURT ALVAR OLSSON
BY Hane and Nydick
ATTORNEYS United States Patent Office 3,359,371
Patented Dec. 19, 1967

3,359,371

CONTROL ARRANGEMENT FOR A RECEIVER FOR PULSE-CODE MODULATED TIME-DIVISION MULTIPLEX SIGNALS

Nils Herbert Edstrom, Skarholmen, Sture Emil Ingvar Fjordland, Hagersten, Walter Emil Wilhelm Jacob, Stuvsta, and Jons Kurt Alvar Olsson, Tullinge, Sweden, assignors to Telefonaktiebolaget L M Ericsson, Stockholm, Sweden, a corporation of Sweden Filed June 3, 1965, Ser. No. 461,063
Claims priority, application Sweden, June 9, 1964, 7,017/64
3 Claims. (Cl. 179—15)

Figure 1:
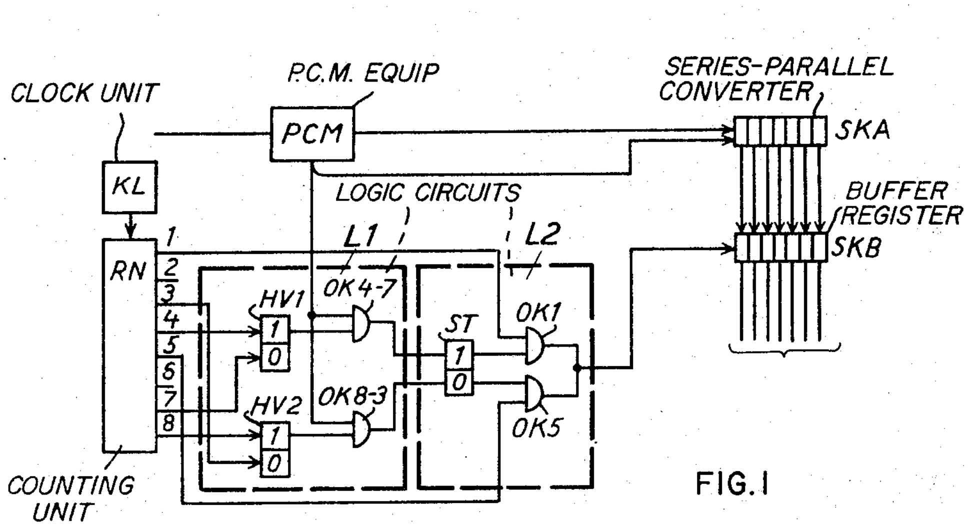

The present invention relates to a control arrangement for receiving pulse-code modulated time-division multiplex signals which are transferred from a series-parallel converter to a buffer memory in a time position determined by the signal received and from said buffer memory are read out in a time position determined by the own clock unit of the receiver exchange and in which the signals received have a phase shift caused by the line and varying in relation to said clock unit, but having the same frequency as the clock unit. The purpose of the invention is to prevent that said time position of the transferring to the buffer memory coincides with or is close to the time position in which reading out occurs.

In a system for transferring of pulse-code modulated time-division multiplex signals between a number of receivers and senders in an intermediate exchange which connects a required incoming channel (time position) with a required outgoing channel, the signals must be in synchronism and in stable phase relative to each other. For controlling the signals so as to be in synchronism with each other by means of a central clock unit there are a number of solutions. The equalization of the phase shift or of the difference in the phase shift that arises between the signals transferred through different links due to the different propagation times of the links involves however difficulties. It has been suggested that each link should function in its own phase without carrying out any phase compensation on the lines and that the signals are stored in a central memory in the intermediate exchange in coded shape in correspondence to the time-division multiplex position. A central clock device in the intermediate exchange controls the sending-out of all coded signals stored in the memory so as to be in synchronism and in phase with each other. Thus the phase shift between the signals in different incoming links does not have any influence on the signals sent out.

In receivers of said type there belongs to each incoming link a series-parallel converter, from which the signals are transferred to a buffer register and from said last mentioned register is carried out reading-out and transmission to the central memory. The transferring from the series-parallel converter to the buffer register occurs for example during the last bit-position in the pulse-code modulated signal. The reading-out from the buffer register is carried out during a time position that is depending on the own clock unit of the intermediate exchange. In view of the fact that the time position of the transferring pulses is varying due to the varying propagation time of the line, there is the danger that the transferring pulse and the reading-out pulse could come too near to each other or coincide, so that the signal cannot be transferred to the memory. The purpose of the invention is to provide a secure time interval between the transferring pulse and the reading out pulse independently of the phase shift in the respective link or of the changes in phase shift.

This is obtained by means of the arrangement according to the invention which comprises a counting chain driven by the own clock unit of the exchange which chain on its respective outputs produces a pulse in each of the bit-positions of the pulse-code modulated signal, a first logic circuit which is activated on two alternative outputs in dependence on the fact that said transferring signal occurs simultaneously with one or the other of two time position ranges, which extend over a number of the pulses obtained from the output of the counting chain, and a second logic circuit which allows the passing of two alternative reading out pulses selected among the output pulses of the counting chain in such a way that they are lying each within its own time position range of said two time position ranges, the condition for the passing of either of said two reading out pulses being that the transferring signal occurs within the time-position range belonging to the other reading-out pulse.

The invention will be explained more in detail herebelow by means of an embodiment with reference to the drawing in which FIG. 1 is a block diagram of the arrangement according to the invention and FIGS. 2*a*–2*k* are explaining diagrams showing the time positions of the pulses.

In FIG. 1 which shows only those parts of a receiver for pulse-code modulated signals which are necessary for the understanding of the concept of the invention, a series-parallel converter SKA belongs to a definite transmission link. To said converter are fed signals from the line through a PCM-equipment not shown in detail. The signals consist of eight bits, seven of which are used for the information itself and the eighth bit-position is used i.a. for transferring the signal from the series-parallel converter SKA to a buffer register SKB. The reading-out of the signal from the buffer register SKB for further transferring to a central memory is carried out by means of a reading-out pulse obtained from the own clock unit of the exchange. It is easy to see that this reading out pulse must occur at such a moment that it does not come too close to or coincide with the transferring of the signal from the series-parallel converter to the buffer register, as otherwise the signal would be lost or be mutilated before having been transferred to the memory. In other words the moment of the transferring from the series-parallel converter to the buffer register must be selected in such a way that the transferring pulse is prevented from coinciding with the reading out pulse in spite of the fact that the phase shift through the different links varies and the transferring pulse may have an arbitrary position. Thus it is necessary that the moment of the reading out pulse is made variable and dependent on the phase shift of the link, in other words dependent on the time position of the transferring pulse. The time period of the reading-out also includes the time of a zero setting operation during or immediately after the reading-out by means of a device not shown in FIG. 1.

Figures 2A, 2B, 2C, 2D, 2E, 2F, 2G, 2H, 2J, 2K:
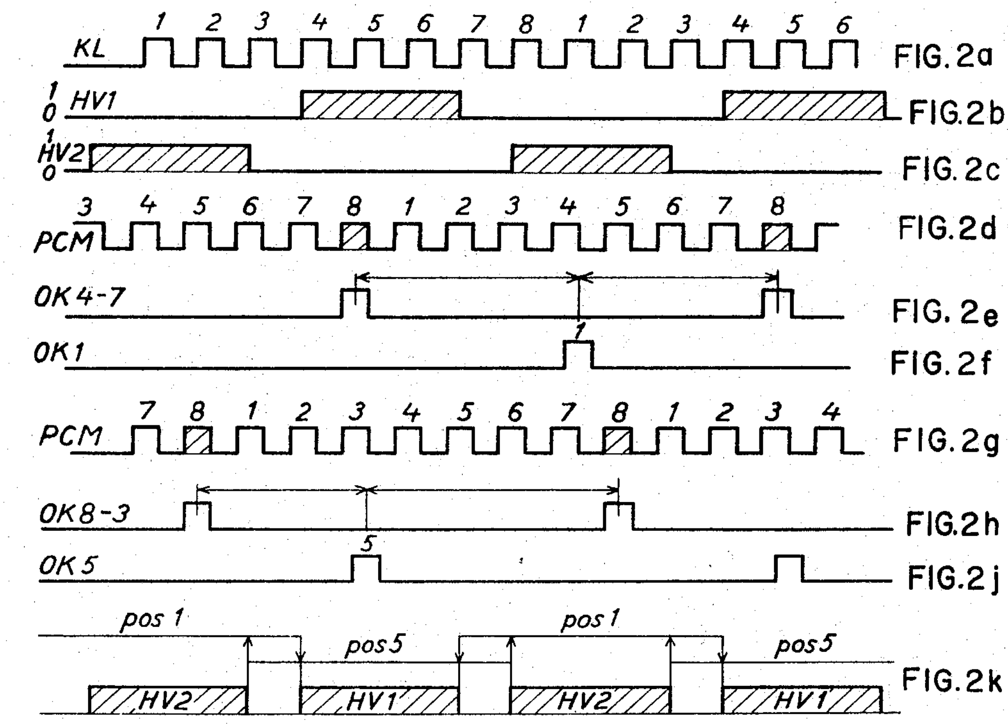

A counting unit RN driven by a central clock unit KL of the exchange which counting unit due to its eight outputs gives cyclically repeated pulses (FIG. 2*a*) in correspondence with the respective bit-positions of a signal that is in phase and in synchronism with the central clock unit. By HV1 and HV2 are indicated two bistable circuits or auxiliary flip-flops the first of which is set to the 1-condition by the 4th bit-position and is restored to the 0-condition by the 7th bit-position and the second is set to the 1-condition by means of the 8th bit-position and is set to 0 by means of the 3rd bit-position. The change in the condition of the auxiliary flip-flops as a function of time is shown in FIGS. 2*b* and 2*c*. The signal from the 1-output of the auxiliary flip-flops is supplied to the input of two and-circuits OK4–7 and OK8–3 the second input of which obtains the transferring pulse influenced by the phase shift of the PCM-link. If thus the transferring pulse should occur between the 4th and the 7th pulse of the counting unit, the and-circuit OK4–7 will be activated.

If on the other hand the transferring pulse occurs between the 8th and the 3rd pulse of the counting unit, the and-circuit OK8–3 will be activated. By ST is indicated a bistable circuit which can obtain a signal alternatively from the output of the and-circuit OK4–7 or from the output of the and-circuit OK8–3 and which when having obtained the signal from the first mentioned output is set to the 1-condition and when having obtained the signal from the last mentioned output is set to the 0-condition. The outputs which correspond to the 1-condition or the 0-condition respectively of the bistable circuit ST are connected to the inputs of two and-circuits OK1 and OK5 the other input of which is connected to the first and the fifth output respectively of the counting unit RN. The outputs of the and-circuits are connected to the buffer memory SKB in order to give a reading out pulse. As is evident, only one of the pulse positions 1 or 5 respectively can occur as the position of the reading out pulse depends upon which of the circuits OK1 or OK5 respectively is activated and that the bistable circuit ST is in 1-condition or in 0-condition. If the transferring pulse position of the PCM-link falls for example within the time period between the pulse positions 4 and 7, the bistable circuit ST will be in 1-condition and consequently the pulse 1 will appear on the output of the and-circuit OK1 as a reading out pulse. The reading out pulse will in other words lie well outside the range within which the transferring pulse is located. This appears from FIGS. 2*d, e* and *f*. If on the other hand the transferring pulse appears between the 8th and the 3rd pulse position of the counting means, the bistable circuit ST will switch to the 0-condition, so that the and-circuit OK5 is activated and the pulse 5 from the counting unit RN appears as a reading out pulse. The reading out pulse will thus again occur at a satisfactory time distance from the transferring pulse. This case appears from FIGS. 2*g, h* and *j*.

The bistable circuit ST does not change its condition until it obtains an impulse that will switch it to the opposite condition. It is switched to the 1-condition when obtaining the first pulse from the and-circuit OK4–7 and is maintained in this condition until it is switched from the 1-condition to the 0-condition when obtaining the first pulse from the and-crcuit OK8–3 and so on.

The fact that the bistable circuits HV1 and HV2 have their active time position ranges only during three pulse positions (4, 5, 6 respectively 8, 1, 2) is used according to the invention to prevent that the reading out pulse unnecessarily moves from pulse position 1 to 5 or vice versa if the time position of the transferring pulse should occur within or vary within the limit range between the two time position ranges. By means of said time intervals between the active time periods of flip-flops HV1 and HV2 the position of the reading-out pulse in the critical limit positions 3 and 7 always corresponds to the position that belongs to the last occupied condition of the bistable circuit ST. Hence, if the bistable circuit ST has been set to the condition corresponding to the reading out pulse 1 and by a decrease of the phase shift of the link the transferring pulse is displaced to the 3rd pulse position of the clock unit, the reading out pulse will be maintained unchanged in the pulse position 1 of the clock unit as indicated in FIG. 2*k*. If the transferring pulse begins to coincide with the signal obtained from the bistable circuit of flip-flop HV2, the bistable circuit ST will switch to the condition 0 and the pulse position 5 will appear as a reading out pulse. If now the phase shift of the link should increase again, so that the coincidence with the bistable circuit of flip-flop HV2 ceases the bistable circuit ST will remain in the position occupied until the transferring pulse coincides with the signal obtained from the bistable circuit of flip-flop HV1 which signal begins in the bit-position 4. The bistable circuit ST is switched and the bit-position 1 occurs as a reading out pulse.

The same consideration is valid when the transferring pulse moves with varying phase shift into the limit range between the bit-positions 7 and 8. It is essential that the switching of the bistable circuit ST and thus the time position of the reading out pulse is dependent not only on the phase position of the transferring pulse relatively to the central clock unit but also on the direction of the displacement of the phase shift as indicated in FIG. 2*k*.

Thus a "hysteresis" is provided that prevents unnecessary change in the position of the reading out pulse at small and rapid phase changes in the time position of the transferring pulse in the limit ranges between the 3rd and the 4th and the 7th and the 8th bit-position respectively.

We claim:

1. A control arrangement for a receiver for pulse-code modulated time-division multiplex signals comprising in combination: a series-parallel converter into which said signals are supplied in parallel form, a buffer memory, means for transferring said signals from said converter to said buffer memory in a time position determined by the signal received, means for reading out said signals from said buffer memory means, a receiver including a clock unit determining the time position of said reading out, the signals received having a phase shift which is caused by the transmission line and varying in relation to said clock unit but having the same frequency as the clock unit, means for preventing that said time position of transferring coincides with or comes close to the time position for reading out, a counting chain (RN) driven by the clock unit of the receiver exchange which chain at its respective outputs produces a pulse in each of the bit-positions of the pulse-code modulated signal, a first logic circuit (L1) two alternative outputs of which are activated in dependence on the fact that said transferring signal occurs simultaneously with one or the other of two time position ranges extending over a number of the pulses obtained from the output of the counting chain, and a second logic circuit (L2) which in dependence on the activation of said two alternative outputs allows the passing of two alternative reading out pulses selected among the output pulses of the counting chain in such a way that each reading out pulse is located within its own time position range of said two time position ranges, the condition of the passing of either of said two reading out pulses being that the transferring signal shall occur within the time position range belonging to the other reading out pulse.

2. An arrangement according to claim 1, characterized thereby that the time position ranges are selected in such a way that they are separated by an interval of at least one pulse duration during which interval no change of condition can occur on the outputs of the first logic circuit (L1), the second logic circuit (L2) maintaining its condition if the time position of the transferring should move to this interval so as to avoid an unnecessary change between the two possible reading out positions when the transferring pulse changes its position in the neighborhood of the limit between the two pulse position ranges.

3. In an arrangement for receiving pulse-code modulated time division multiplex signals, comprising a series-parallel converter to which the signals received are supplied, a buffer memory means for transferring said signals in parallel form to said buffer memory means in a time position determined by the signal received and means for reading out said pulse code modulated signals from said buffer memory means, a receiver including a clock unit determining the time position of said reading out, said received pulse code modulated signals having a variable phase shift relatively to said clock unit while having the same frequency as the clock unit, means for preventing that said transferring time position coincides with or comes close to said reading out time position, said means comprising a counting chain driven by said clock unit in the exchange and producing on outputs belonging to the respective stages in the chain a pulse corresponding to each of the pulse positions of the pulse code modulated signal, said pulse positions forming two subsequent pulse position ranges, a first logic circuit having inputs connected to inputs of said chain and having two outputs activated alternatively depending on the fact whether said transferring signal occurs simultaneously with pulses obtained from said chain and belonging to one or the other of said two subsequent pulse position ranges, and a second logic circuit obtaining said alternative output signals from said first logic circuit and also obtaining pulses from said chain correspondingly to at least one pulse position in each of said two subsequent pulse position ranges, said second logic circuit having an output producing a reading out pulse and the inputs obtained from said first logic circuit and said inputs obtained from said chain being combined in such manner that activation of the output of said second logic circuit is only possible if the input from said first logic circuit corresponding to one of said pulse position ranges and an input from said chain belonging to a pulse position within the other of said pulse position ranges occur simultaneously.

References Cited

UNITED STATES PATENTS

| | | | |
|---|---|---|---|
| 3,270,136 | 8/1966 | Heaton | 179—15 |
| 3,310,743 | 3/1967 | Cleabury et al. | 179—15 |

ROBERT L. GRIFFIN, *Primary Examiner.*

JOHN W. CALDWELL, *Assistant Examiner.*